United States Patent
Mei et al.

(10) Patent No.: US 7,846,862 B2
(45) Date of Patent: *Dec. 7, 2010

(54) METHANOL OXIDATION CATALYST

(75) Inventors: Wu Mei, Yokohama (JP); Taishi Fukazawa, Fuchu (JP); Itsuko Mizutani, Yokohama (JP); Tsuyoshi Kobayashi, Kawasaki (JP); Yoshihiko Nakano, Yokohama (JP); Mina Farag, Fremont, CA (US); Yi-Qun Li, Fremont, CA (US); Shinji Aoki, Fremont, CA (US)

(73) Assignees: Kabushiki Kaisha Toshiba, Tokyo (JP); Intematix Corporation, Fremont, CA (US)

( * ) Notice: Subject to any disclaimer, the term of this patent is extended or adjusted under 35 U.S.C. 154(b) by 530 days.

This patent is subject to a terminal disclaimer.

(21) Appl. No.: 11/863,856

(22) Filed: Sep. 28, 2007

(65) Prior Publication Data
US 2009/0081391 A1 Mar. 26, 2009

(30) Foreign Application Priority Data
Sep. 21, 2007 (JP) ............................. 2007-244855

(51) Int. Cl.
| | |
|---|---|
| H01M 4/02 | (2006.01) |
| H01M 4/36 | (2006.01) |
| H01M 4/92 | (2006.01) |
| H01M 4/90 | (2006.01) |
| C22C 5/04 | (2006.01) |
| B01J 23/00 | (2006.01) |
| B01J 23/40 | (2006.01) |
| B01J 23/42 | (2006.01) |
| B01J 23/44 | (2006.01) |
| B01J 21/18 | (2006.01) |
| B01J 23/74 | (2006.01) |
| B01J 27/185 | (2006.01) |
| B01J 27/02 | (2006.01) |

(52) U.S. Cl. .................. 502/300; 502/305; 502/308; 502/312; 502/325; 502/326; 502/339; 502/180; 502/182; 502/185; 502/213; 502/216; 429/523; 429/524; 429/526; 420/462; 420/466; 420/467; 420/468; 427/115; 427/123; 427/124; 427/125; 427/126.5; 427/126.6

(58) Field of Classification Search .................. 502/300, 502/325, 305, 308, 312, 326, 339, 180, 182, 502/185, 213, 216; 429/40–44, 523, 524, 429/526; 420/462, 466–468; 427/115, 123–125, 427/126.5, 126.6
See application file for complete search history.

(56) References Cited

U.S. PATENT DOCUMENTS 3,506,494 A * 4/1970 Adlhart .................. 429/13

(Continued)

FOREIGN PATENT DOCUMENTS

JP 2004-281177 * 10/2004

(Continued)

*Primary Examiner*—Patricia L Hailey
(74) *Attorney, Agent, or Firm*—Oblon, Spivak, McClelland, Maier & Neustadt, L.L.P.

(57) ABSTRACT

A methanol oxidation catalyst is provided, which includes nanoparticles having a composition represented by the following formula 1:

$$Pt_xRu_yT_zQ_u \quad \text{formula 1}$$

In the formula 1, the T-element is at least one selected from a group consisting of Mo, W and V and the Q-element is at least one selected from a group consisting of Nb, Cr, Zr and Ti, x is 40 to 90 at. %, y is 0 to 9.9 at. %, z is 3 to 70 at. % and u is 0.5 to 40 at. %. The area of the peak derived from oxygen bond of T-element is 80% or less of the area of the peak derived from metal bond of T-element in a spectrum measured by an X-ray photoelectron spectral method.

22 Claims, 4 Drawing Sheets

U.S. PATENT DOCUMENTS

| | | | |
|---|---|---|---|
| 4,487,818 A * | 12/1984 | Ovshinsky et al. | 429/44 |
| 5,183,713 A * | 2/1993 | Kunz | 429/44 |
| 5,773,162 A * | 6/1998 | Surampudi et al. | 429/39 |
| 5,939,220 A * | 8/1999 | Gunner et al. | 429/40 |
| 6,916,764 B2 * | 7/2005 | Choi et al. | 502/326 |
| 7,425,384 B2 * | 9/2008 | Surampudi et al. | 429/42 |
| 2004/0072061 A1 * | 4/2004 | Nakano et al. | 429/44 |
| 2005/0048205 A1 * | 3/2005 | Woo et al. | 427/248.1 |
| 2007/0087258 A1 | 4/2007 | Mei et al. | |
| 2007/0254806 A1 | 11/2007 | Mei et al. | |
| 2009/0029219 A1 | 1/2009 | Fukazawa et al. | |
| 2009/0050484 A1 | 2/2009 | Yamamoto et al. | |
| 2009/0061276 A1 | 3/2009 | Tamura et al. | |
| 2009/0082198 A1 | 3/2009 | Mei et al. | |
| 2009/0247401 A1 | 10/2009 | Mei et al. | |

FOREIGN PATENT DOCUMENTS

| | | | |
|---|---|---|---|
| JP | 2006-179445 | * | 7/2006 |

* cited by examiner

METHANOL OXIDATION CATALYST

CROSS-REFERENCE TO RELATED APPLICATIONS

This application is based upon and claims the benefit of priority from prior Japanese Patent Application No. 2007-244855, filed Sep. 21, 2007, the entire contents of which are incorporated herein by reference.

BACKGROUND OF THE INVENTION

1. Field of the Invention

The present invention relates to a methanol oxidation catalyst and a method for producing the methanol oxidation catalyst.

2. Description of the Related Art

Solid polymer type fuel cells, and particularly solid polymer type fuel cells using an aqueous methanol solution as fuel converts chemical energy into electric power by the catalytic reaction of an electrode. Therefore, a highly active catalyst is essential to develop a high-performance fuel cell.

The theoretical voltage obtained by the catalytic reaction of the electrode is 1.21V, whereas the voltage loss due to the PtRu catalyst is about 0.3V. Therefore, an anode catalyst having high activity (methanol oxidation activity) over PtRu is desired. In the meantime, current PtRu anode catalysts have problems due to elution of Ru, and therefore, highly active methanol oxidation catalysts having a low Ru content and Ru-free composition are desired.

Studies have been made as to methanol oxidation catalysts having various composition types so far. For example, a method in which metals such as tungsten, tantalum and niobium are added is described in U.S. Pat. No. 3,506,494. In Jpn. Pat. Appln. KOKAI Publication Nos. 2004-281177 and 2006-179445, there are descriptions concerning a sputtering process. There are only a few reports as to a reduction in the amount of Ru to be added and Ru-free compositions.

Because the catalysts are nanoparticles, the surface electron state of the catalyst particles and the nano-structure of the particles are strongly dependent on the type and amount of elements to be added. In order to obtain high activity and high stability, it is necessary that the type and amount of the elements to be added and a combination of elements are made to be appropriate. Studies concerning catalyst compositions and processes are insufficiently made and a highly stable catalyst having sufficient methanol oxidation activity has not been established yet.

BRIEF SUMMARY OF THE INVENTION

A methanol oxidation catalyst according to one aspect of the present invention comprises:

nanoparticles having a composition represented by the following formula 1:

$$Pt_xRu_yT_zQ_u \quad \text{formula 1}$$

where the T-element is at least one selected from a group consisting of Mo, W and V and the Q-element is at least one selected from a group consisting of Nb, Cr, Zr and Ti, x is 40 to 90 at. %, y is 0 to 9.9 at. %, z is 3 to 70 at. % and u is 0.5 to 40 at. %, wherein the area of the peak derived from oxygen bond of T-element is 80% or less of the area of the peak derived from metal bond of T-element in a spectrum measured by an X-ray photoelectron spectral method.

A method for manufacturing the methanol oxidation catalyst according to one aspect of the present invention comprises:

keeping a conductive support at 400° C. or less; and depositing structural metal elements to the conductive support by a sputtering method or vapor deposition method to form the nanoparticles.

DETAILED DESCRIPTION OF THE INVENTION

The inventors have made earnest studies as to the relation between a process of synthesizing a catalyst and the composition of the catalyst and as a result, obtained the following findings. In nanoparticles having the composition represented by the following formula (1), T-element and Q-element are introduced as co-catalyst to bind with a major catalyst element constituted of Pt or the like through a metal bond to obtain a highly active catalyst. Such a metal bond can be formed by making a PtRu alloy contain a T-element and a Q-element on a conductive support kept at 400° C. or less by a sputtering method or vapor deposition method.

$$Pt_xRu_yT_zQ_u \quad (1)$$

The T-element is at least one selected from the group consisting of Mo, W and V and the Q-element is at least one selected from the group consisting of Nb, Cr, Zr and Ti. x is 40 to 90 at. %, y is 0 to 9.9 at. %, z is 3 to 70 at. % and u is 0.5 to 40 at. %.

Pt is a major catalyst element. Pt is very effective for the oxidation of hydrogen and dehydrogenation reaction of organic fuel. Accordingly, x is limited to 40 to 90 at. %. When a part of Pt is substituted with other metals, the activity of the catalyst can be more improved. As these metals, noble metals such as Rh, Os, Ir, Pd, Ag and Au are preferable because these metals are particularly superior in chemical stability.

Ru is an element effective to restrain CO poisoning. However, elution of Ru in power generation and a deterioration of a cathode catalyst caused by the migration of the eluted Ru to the cathode side have been confirmed in recent years. When a large amount of Ru is present, there is a large fear that this gives an adverse influence on long-term durability. Also, current technologies have not industrially succeeded in recycling of Ru yet. Therefore, the addition of a large amount of Ru leads to an increase in the overall cost including a recycle cost and is therefore disadvantageous in the spread of the fuel cell. Accordingly, y is limited to 9.9 at. % or less and a Ru-free composition is particularly preferable. In the embodiment, sufficient methanol oxidation activity has been attained even in the case of adding a low amount of Ru or in the case of using a Ru-free composition, by adding a combination of specified elements.

The T-element and the Q-element are co-catalysts. The T-element is at least one selected from Mo, W and V and the Q-element is at least one selected from the group consisting of Nb, Cr, Zr and Ti. The catalyst according to the embodiment in which these T-element and Q-element are added to Pt and Ru exhibits high stability and high activity. It is inferred that the surface structure and electronic state of the catalyst which are originated from a specified mixing state of each element are main causes leading to improved stability and activity. Particularly, it is considered that the presence of a metal bond between the T-element and Pt and Ru and the presence of an oxygen bond between the Q-element and oxygen contribute to an improvement in stability and activity.

It is difficult for the Q-element having an oxygen bond to exist inside the catalyst particles. It is therefore inferred that the Q-element having an oxygen bond exists on the surface of the catalyst to contribute to the high stability and high activity. For the T element, besides the peak derived from its metal bond, the peak from its oxygen bond is usually observed in a XPS spectrum. This indicates that some of the T-element atoms exist on the catalyst surface. To obtain high activity, it is important that the peak area of oxygen bond of T element is 80% or less of that of metal bond of T element in a XPS spectrum When, for example, the catalyst particles are synthesized by a solution method, a reaction reducing W, V, Mo and the like is scarcely caused and it is therefore difficult to proceed with the formation of an alloy of such an element and the major catalyst elements (Pt, Ru). Therefore, a large part of the catalyst particles are mixtures of the PtRu nanoparticles and oxides nanoparticles of the T-element. The catalyst particles synthesized by a solution method was subjected to surface analysis using an X-ray photoelectron spectral method (XPS). It was found that almost all the bonds of Mo and T-element are oxygen bonds.

Photoelectrons (signals) which can be detected by XPS measurement are limited to those existing to a depth of about several nano-microns in the vicinity of the surface of the sample. It is therefore considered that in the catalyst particles of the embodiment, the T-element in a metal state exists in a region within several nano-microns from the surface. Generally, pure T-element metal nano-particles cannot exist stably in the air. Taking these facts into consideration, it is judged that alloy particles of the T-element and Pt and Ru exist in the catalyst of the embodiment.

The proportion occupied by the signal intensity of a part close to the surface is very large among all signal intensities detected by the XPS measurement. For this reason, when an oxide layer is formed on the surface of the catalyst nanoparticles, it is highly possible that the peak area (signal) of the oxide bond of the T-element is higher than the peak area of the metal bond in the XPS spectrum. Therefore, in order to obtain the catalyst having high stability and activity, it is necessary to optimize the composition of the catalyst and production process to form the specified mixing state into which Pt, Ru, the T-element and Q-element are put.

The content z of the T-element is limited to 3 to 70 at. %. When the content z is less than 3 at. %, the co-catalyst action of the T-element is low. On the other hand, when the T-element is contained in a large amount exceeding 70 at. %, the number of major active sites constituted of Pt and Ru atoms is relatively decreased, leading to deteriorated catalyst activity. The content z of the T-element is more preferably 10 to 25 at. %.

The content u of the Q-element is limited to 0.5 to 40 at. %. When the content u is less than 0.5 at. %, the co-catalyst action of the Q-element is low. On the other hand, when the Q-element is contained in a large amount exceeding 40 at. %, the number of major active sites constituted of Pt and Ru atoms is decreased, leading to deteriorated catalyst activity. The content u of the Q-element is more preferably 1 to 15 at. %.

When the content z of the T-element is 30 at. % or less, it is preferable to contain at least one selected from the group consisting of Sn, Hf and Ni in an amount of 0.5 to 30 at. %. The methanol oxidation activity of the catalyst can be thereby improved. The composition of such a catalyst may be represented by the following formula (2).

$$Pt_xRu_yT_zQ_uA_t \quad (2)$$

The T-element is at least one selected from the group consisting of Mo, W and V, the Q-element is at least one selected from the group consisting of Nb, Cr, Zr and Ti and the A-element is at least one selected from the group consisting of Sn, Hf and Ni. x is 40 to 90 at. %, y is 0 to 9.9 at. %, z is 10 to 30 at. %, u is 0.5 to 20 at. % and t is 0.5 to 30 at. %.

In the catalyst having the composition represented by the above formula (2), for the T element, besides the peak derived from its metal bond, the peak from its oxygen bond is usually observed in a XPS spectrum. To obtain high activity, it is important that the peak area of oxygen bond of T element is 80% or less of that of metal bond of T element in a XPS spectrum In order to obtain the catalyst having high stability and activity, it is necessary to optimize the composition of the catalyst and production process to form the specified catalyst nano-particle structure and the specified mixed electron state. The content t of the A-element is more preferably 1 to 25 at. % in order to exhibit the co-catalyst action of the A-element sufficiently.

Besides the structural metal elements as mentioned above, oxygen may be contained in the methanol oxidation catalyst according to the embodiment. As already explained, the catalyst of this embodiment is highly possibly formed with an oxide layer on the surface thereof. This oxide layer highly possibly contributes to the high activity and high stability of the catalyst. If the content of oxygen is 25 at. % or less, the catalyst activity is not significantly deteriorated.

Also, at least one selected from Mn, Fe, Co, Cu and Zn may be added in the methanol oxidation catalyst according to the embodiment. In this case, the activity of the catalyst can be more improved. This metal is preferably added in a content of 1 to 20 at. %.

The content of impurity elements such as P, S and Cl is 0.1 at. % or less. There is the possibility that these impurity elements intermingle during the production and treating process of the catalyst and membrane electrode assembly. However, if the content of these impurities is 0.1 at. % or less, a deterioration in characteristics is small. It is considered that the surface structure of the catalyst according to this embodiment has high allowance.

The catalyst particles according to the embodiment are preferably nanoparticles. In this case, the highest activity is obtained. The average particle diameter of the nanoparticles is preferably 10 nm or less. If the particle diameter of the catalyst particles exceeds 10 nm, there is a fear that the efficiency of catalyst activity is significantly decreased. The average particle diameter is more preferably in the range of 0.5 to 10 nm. When the average particle diameter is less than 0.5 nm, it is difficult to control the catalyst synthesizing process, bringing about an increase in the cost of catalyst synthesis. As the catalyst particles, nanoparticles having an average particle diameter of 10 nm or less may be singly used. However, an aggregate (secondary particles) of primary particles constituted of these nanoparticles may also be used. Also, these nanoparticles may be supported by a conductive support.

Figure 1:
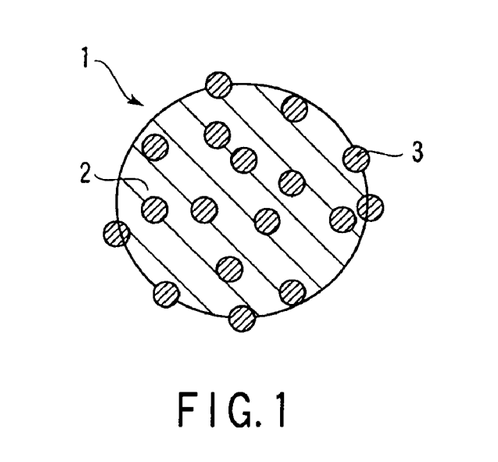
FIG. 1 is a typical view of a methanol oxidation catalyst according to one embodiment.
Figure 2:
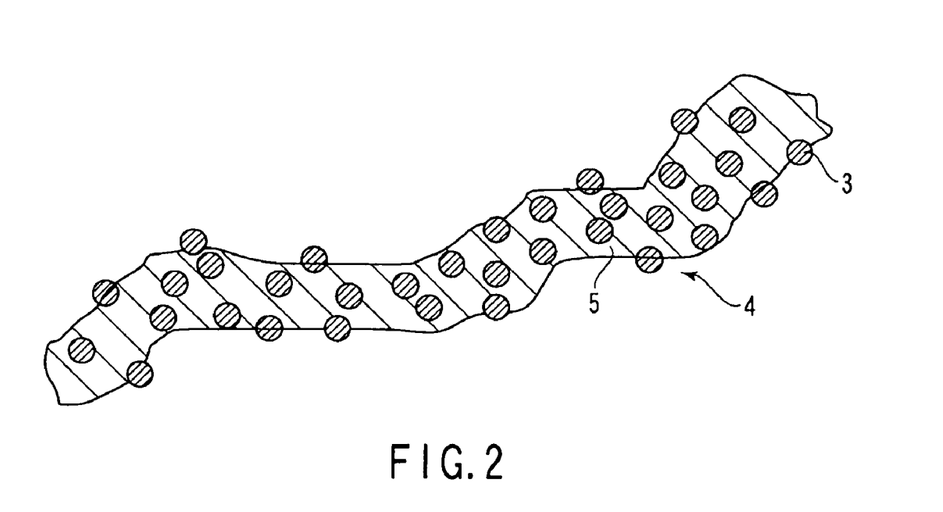
FIG. 2 is a typical view of a methanol oxidation catalyst according to another embodiment.
Figure 3:
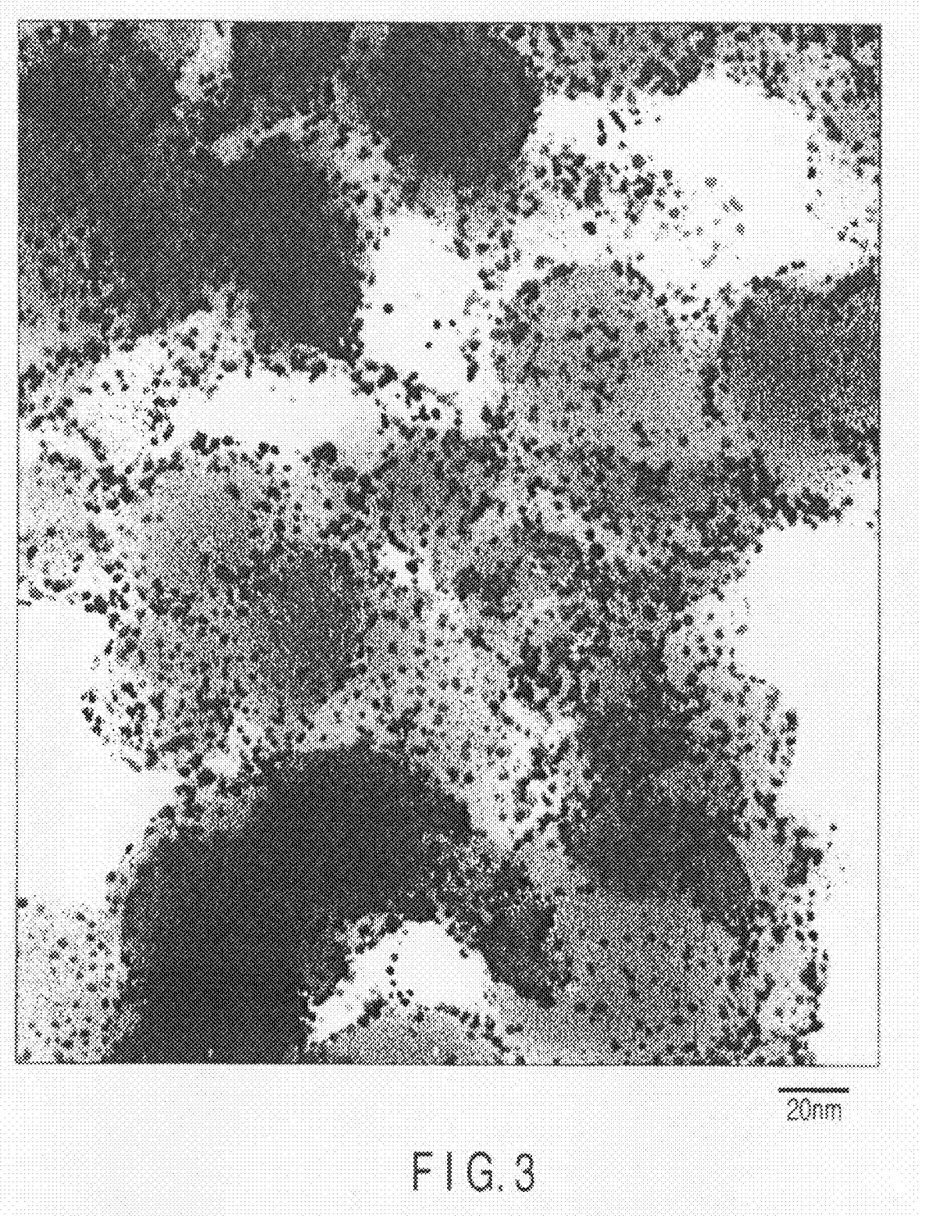
FIG. 3 is a TEM photograph of a catalyst layer constituted by a methanol oxidation catalyst according to one embodiment.

As shown in FIG. 1, a carbon-supported catalyst 1 may be constituted by allowing carbon particles 2 as the conductive support to support catalyst particles 3. Alternatively, as shown in FIG. 2, a carbon-supported catalyst 4 may be constituted by alloying a carbon nano-fiber 5 as the conductive support to support the catalyst particles 3. FIG. 3 shows a TEM photograph of a catalyst layer constituted of catalyst particles supported by carbon particles. Examples of the conductive support may include carbon black. However, the conductive support is not limited to carbon black but any desired support superior in conductivity and stability may be used.

As the conductive support, nanocarbon materials, for example, fiber-form, tube-form or coil-form materials have been developed. These supports are different in surface state. The catalyst particles according to the embodiment are more improved in activity when supported by these nanocarbon materials. Besides these carbon materials, conductive ceramics materials may be used as the support. In this case, a more synergetic effect of the ceramics support and the catalyst particles can be expected.

The methanol oxidation catalyst according to the embodiment may be manufactured by a sputtering method or a vapor deposition method. The inventors have found that these methods can more easily produce a catalyst having a metal bond than solution methods such as an impregnation method, precipitation method or colloidal method. The solution methods not only entail high costs but also have difficulties in obtaining a desired bond state. In a sputtering method or vapor deposition method, an alloy target may be used. Alternatively, each metal target of the structural elements may be used to carry out simultaneous sputtering or simultaneous vapor deposition.

When a sputtering method is adopted, first, a particulate or fibrous conductive support is sufficiently dispersed. Next, the dispersed support is received in a holder disposed in a chamber of a sputtering apparatus and is then treated by sputtering with stirring to allow the structural metals of the catalyst to adhere to the dispersed support. The catalyst can be made to adhere uniformly to the support by this stirring. The temperature of the support during sputtering is preferably 400° C. or less. When the temperature exceeds 400° C., there is the case where phase separation of the catalyst particles is caused, bringing about non-stabilized catalyst activity. In order to cut the cost required to cool the support, the lower limit of the temperature of the support is desired to be 10° C. The temperature of the support may be measured by a thermocouple.

As the conductive support sputtered with the catalyst particles, porous paper containing conductive carbon fibers, an electrode diffusion layer or an electrolytic membrane may also be used. In this case, it is necessary to form the catalyst in the state of nanoparticles by regulating the process. For the same reason as above, the temperature of the porous paper is desirably 400° C. or less.

After the catalyst particles are formed by a sputtering method or vapor deposition method, acid washing treatment, alkali treatment or heat treatment is carried out, whereby the activity of the catalyst can be more improved. It is considered that the structure or surface structure of the catalyst can be made into more appropriate state by such treatment.

In the acid washing treatment, an aqueous acid solution may be used and an aqueous sulfuric acid solution is exemplified as the aqueous acid solution. In the alkali treatment, an aqueous alkali solution may be used. The structure or surface structure of the catalyst may be made into a more appropriate state by the heat treatment. With regard to the after-heat treatment, the catalyst particles are preferably treated at 10 to 40° C. or less in an atmosphere where the partial pressure of oxygen is less than 5%.

Because the formation of the nanoparticles is promoted, other materials such as carbon may be deposited to the conductive support together with the structural metal elements. Moreover, metals having high solubility, for example, Cu, Zn or Ni and the structural metal elements may be sputtered or deposited simultaneously and then, Cu, Zn, Ni or the like can be removed by, for example, acid washing treatment.

Figure 4:
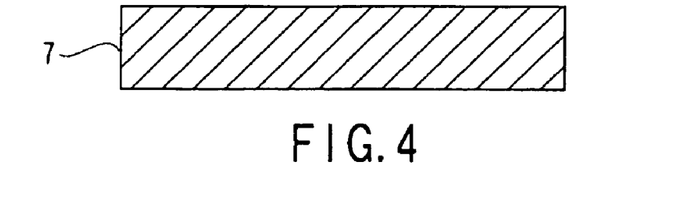
FIG. 4 is a sectional view showing a process of producing a laminate type electrode.
Figure 5:
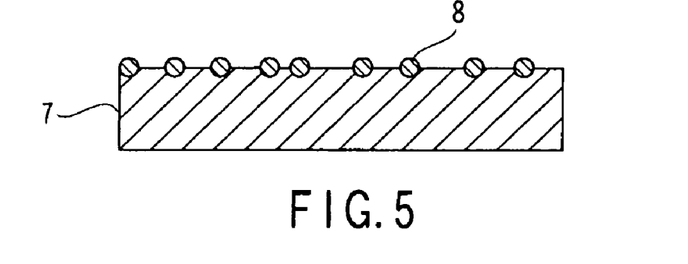
FIG. 5 is a sectional view showing a process subsequent to the process shown in FIG. 4.
Figure 6:
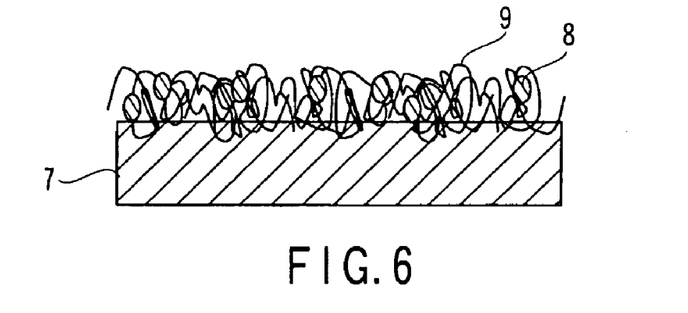
FIG. 6 is a sectional view showing a process subsequent to the process shown in FIG. 5.

A method for producing a laminate type electrode by using a methanol catalyst according to the embodiment will be explained with reference to FIGS. 4 to 11. First, as shown in FIG. 4, a carbon paper 7 is prepared and as shown in FIG. 5, Ni particles 8 are deposited to the surface of the carbon paper 7 by a sputtering method. Next, a carbon nano-fiber (CNF) layer 9 is, as shown in FIG. 6, synthesized in the condition such as $C_2H_4/H_2$, and 400 to 700° C.

Figure 7:
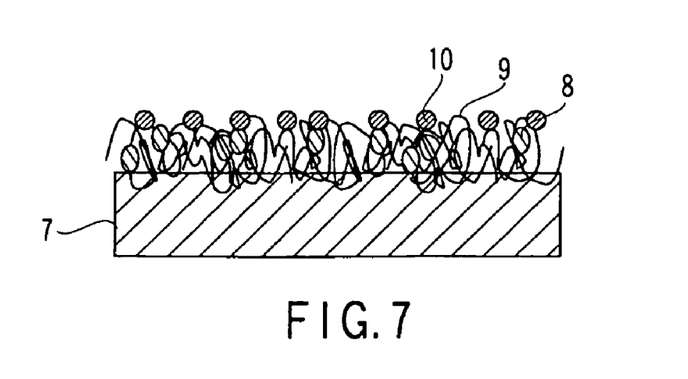
FIG. 7 is a sectional view showing a process subsequent to the process shown in FIG. 6.
Figure 8:
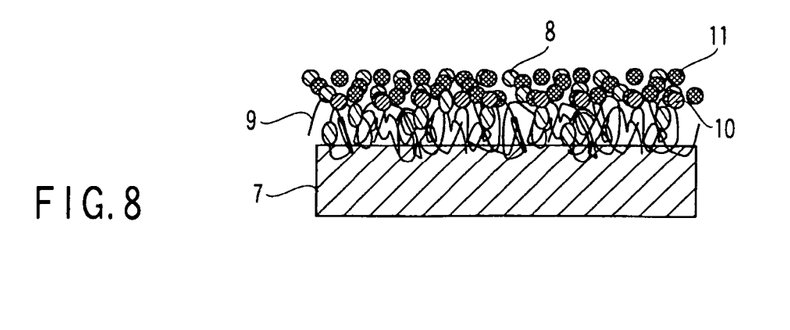
FIG. 8 is a sectional view showing a process subsequent to the process shown in FIG. 7.
Figure 9:
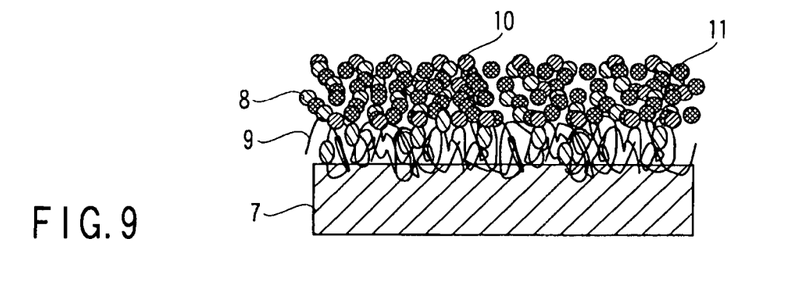
FIG. 9 is a sectional view showing a process subsequent to the process shown in FIG. 8.

The CNF layer 9 is made to carry RtRu particles 10 as shown in FIG. 7 by a sputtering method and then, carbon and nickel are sputtered simultaneously to make the CNF layer 9 carry carbon particles 11 and Ni particles 8 as shown in FIG. 8. This process is repeated to further laminate the RtRu particles 10, carbon particles 11 and Ni particles 8 as shown in FIG. 9.

Figure 10:
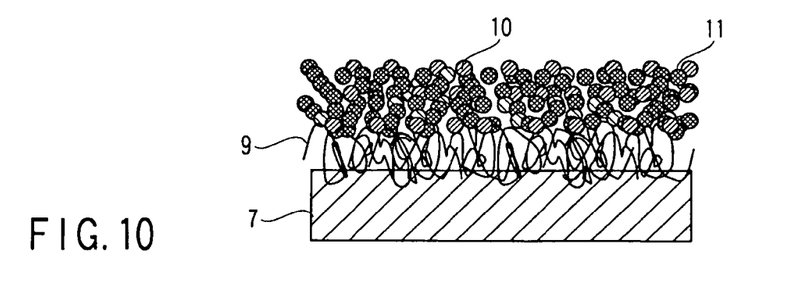
FIG. 10 is a sectional view showing a process subsequent to the process shown in FIG. 9.
Figure 11:
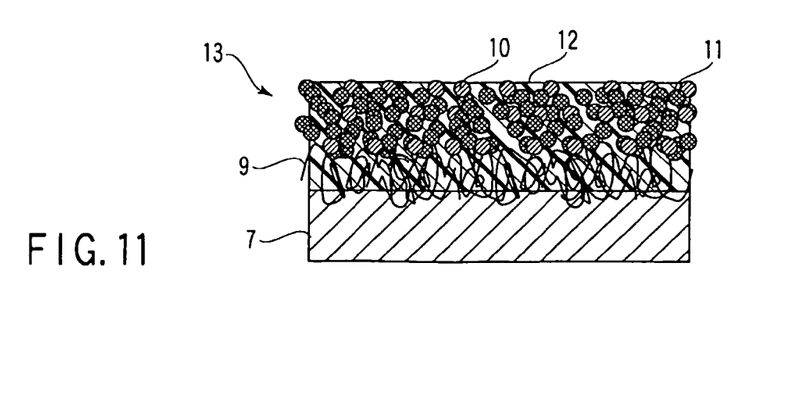
FIG. 11 is a sectional view showing a process subsequent to the process shown in FIG. 10.

The Ni particles 8 are removed by treating with $H_2SO_4$ as shown in FIG. 10, followed by impregnating with Nafion 12 under reduced pressure. A laminate type electrode 13 is obtained by the above steps.

The methanol oxidation catalyst according to the embodiment may be used as an anode electrode of a membrane electrode assembly (MEA). A proton conductive membrane is supported by and interposed between an anode electrode and a cathode electrode to constitute the MEA.

Any material may be used as the proton conductive material contained in the proton conductive membrane or the like without any particular limitation as long as it can transmit protons. Examples of the proton conductive material include fluororesins having a sulfonic acid group such as Nafion (manufactured by Du Pont), Flemion (manufactured by Asahi Kasei Corporation) and Aciplex (manufactured by Asahi Chemical Glass Co., Ltd.) and inorganic materials such as tungstic acid and phosphotungstic acid.

A fuel cell can be manufactured by combining the MEA as mentioned above, means for supplying fuel to an anode electrode and means for supplying an oxidant to a cathode electrode. The number of MEAs used may be one or two or more. If plural MEAs are used, a higher electromotive force can be obtained.

Examples of the present invention will be explained. However, the present invention is not limited to these examples.

Examples 1 to 18 and Comparative Examples 1 to 11

First, a carbon black support (trade name: Vulcan XC72, manufactured by Cabot Corporation, specific surface area: about 230 m²/g) was dispersed sufficiently and received in a holder. This holder was disposed in a chamber of an ion beam sputtering apparatus and then the chamber was evacuated. After the vacuum degree in the chamber reached $3 \times 10^{-6}$ Torr, Ar gas was introduced into the chamber.

Catalyst particles were deposited to a support by carrying out sputtering using a predetermined target such that the catalyst particles had each composition shown in Table 2. As the target, any of a metal target or an alloy target may be used.

The support to which the catalyst particles were deposited was subjected to acid washing treatment using an aqueous acid solution. The aqueous acid solution used here was prepared by adding 10 g of sulfuric acid to 200 g of water. Further, after the support was washed with water, it was dried to obtain a methanol oxidation catalyst.

Comparative Example 12

First, 1000 mL of an ethanol solution containing vanadium chloride and niobium chloride was prepared. The amounts of a vanadium metal and a niobium metal in the solution were 31 mg and 6 mg, respectively. 500 mg of carbon black (trade name: Vulcan XC72, manufactured by Cabot Corporation, specific surface area: about 230 m²/g) was added to the obtained solution, which was sufficiently stirred to disperse the carbon black uniformly. Thereafter, the solution was heated to 55° C. with stirring to volatilize ethanol.

The residue was heated at 300° C. for 3 hours with hydrogen gas flowing at a flow rate of 50 mL/minutes to carry vanadium and niobium on carbon black. Then, 300 mL (amount of a platinum metal: 309 mg) of a cyclohexane solution containing 1,5-cyclooctadienedimethyl platinum was mixed to prepare a solution. The foregoing carbon carrying the aforementioned vanadium and niobium was added in this mixed solution, which was sufficiently stirred to disperse the carbon uniformly. After that, the dispersion solution was heated to 55° C. with stirring to volatilize a solvent.

Moreover, the residue obtained above was heated at 300° C. for 3 hours with hydrogen gas flowing at a flow rate of 50 mL/min. As a result, platinum, niobium and vanadium were carried on the carbon black to obtain a methanol oxidation catalyst of Comparative Example 12.

Each catalyst was subjected to the measurement of XPS using Quantum-2000 manufactured by PHI. A neutralization gun (electron gun and argon gun) was used to make charge-up compensation and charge correction (C1s: C—C=284.6 eV). The peak of each element derived from a metal bond and the peak of each element derived from an oxygen bond were identified. The results are shown in Table 1.

With regard to, for example, the V element measured using a V2p spectrum, a peak found in a bond energy range of 512 to 514 eV was identified as one derived from a metal bond and a peak found in a bond energy range of 516 to 518 eV was identified as one derived from an oxygen bond. With regard to the W element measured using a W4f spectrum, a peak found in a bond energy range of 31 to 34 eV was identified as one derived from a metal bond and a peak found in a bond energy range of 36 to 40 eV was identified as one derived from an oxygen bond.

TABLE 1

| Element | Range where peak exists (eV) | |
|---|---|---|
| | Metal bond | Oxygen bond |
| V | 512-513 (2p3/2) | 516-517 (2p3/2) |
| W | 31-34 (4f7/2) | 36-40 (4f5/2) |

TABLE 1-continued

| Element | Range where peak exists (eV) | |
|---|---|---|
| | Metal bond | Oxygen bond |
| Mo | 227-228 (3d5/2) | 235-237 (3d5/2) |
| Nb | 202-203 (3d5/2) | NbO: 203-205 (3d3/2) |
| | | $Nb_2O_5$: 209-211 (3d5/2) |
| Cr | 574 (2p3/2) | 576-580 (2p3/2) |
| Zr | 178-179 (3d5/2) | $ZrO_2$: 184-185 (3d3/2) |
| Ti | 454 (2p3/2) | TiO: 455 (2p3/2) |
| | | $TiO_2$: 459* |
| Ta | 23-24 (4f7/2) | 27-29 (4f5/2) |
| Si | 99-100 (2p) | 103-104 (2p) |
| Al | 117-118 (2s) | 120-121 (2s) |
| Sn | 493-494 (3d3/2) | 494-496 (3d3/2) |
| Hf | 14-15 (4f7/2) | 17-19 (4f5/2) |

*This, however, cannot be seen highly possibly because this is overlapped on Ru.

When plural T-elements or Q-elements are contained in the catalyst particles, a T-element or Q-element having the highest content is defined as a major T-element or Q-element. A major T-element and major Q-element of each catalyst were measured. The results are listed in the following Table 2. The ratio of the peak areas of a major T-element was defined as the peak area derived from the oxygen bond of the element when the peak area derived from the metal bond of the T-element was 100%. Also, the ratio of the peak areas of a major Q-element was defined as the peak area derived from the metal bond of the element when the peak area derived from the oxygen bond of the Q-element was 100%.

TABLE 2

| | Catalyst composition | Ratio of peak areas (%) | |
|---|---|---|---|
| | | Major T-element* | Major Q-element** |
| Example 1 | $Pt_{70}V_{15}Nb_{15}$ | 30 | Almost 0 |
| Example 2 | $Pt_{70}Ru_8V_{20}Nb_2$ | 40 | 10 |
| Example 3 | $Pt_{40}Ru_5V_{40}Nb_{12}$ | 70 | 30 |
| Example 4 | $Pt_{90}V_5Nb_5$ | 40 | 70 |
| Example 5 | $Pt_{60}V_{30}Cr_{10}$ | 50 | 40 |
| Example 6 | $Pt_{56}Ru_4V_{25}Zr_{15}$ | 30 | 50 |
| Example 7 | $Pt_{50}Ni_{10}V_{30}Nb_{10}$ | 40 | 30 |
| Example 8 | $Pt_{50}Ru_3W_{24}Nb_{23}$ | 50 | 40 |
| Example 9 | $Pt_{50}Ru_7W_{28}Nb_{15}$ | 60 | 50 |
| Example 10 | $Pt_{50}W_{30}Nb_{20}$ | 40 | 60 |
| Example 11 | $Pt_{50}Ru_8W_{26}Cr_{16}$ | 40 | 40 |
| Example 12 | $Pt_{45}Ru_5W_{30}Cr_{20}$ | 50 | 40 |
| Example 13 | $Pt_{60}W_{30}Zr_{10}$ | 50 | 20 |
| Example 14 | $Pt_{50}Ru_8W_{25}Zr_{17}$ | 50 | 30 |
| Example 15 | $Pt_{55}W_{25}Ti_{20}$ | 70 | 20 |
| Example 16 | $Pt_{70}Ru_5W_{10}Ti_{10}$ | 80 | 40 |
| Example 17 | $Pt_{60}Ni_{20}W_{10}Ti_{10}$ | 60 | 40 |
| Example 18 | $Pt_{75}Ni_{15}W_5Zr_5$ | 70 | 50 |
| Example 19 | $Pt_{60}W_{10}Ti_{10}Sn_{20}$ | 50 | 40 |
| Example 20 | $Pt_{70}V_{10}Zr_5Sn_{15}$ | 60 | 50 |
| Example 21 | $Pt_{60}W_{10}Ti_{10}Hf_{20}$ | 40 | 50 |
| Example 22 | $Pt_{75}W_5Zr_5Hf_{15}$ | 40 | 40 |
| Comparative Example 1 | $Pt_{50}Ru_{50}$ | — | — |
| Comparative Example 2 | $Pt_{50}Ru_{48}V_2$ | 60 | — |
| Comparative Example 3 | $Pt_{50}Ru_{45}W_5$ | 60 | — |
| Comparative Example 4 | $Pt_{50}Ru_{48}Nb_2$ | — | 50 |
| Comparative Example 5 | $Pt_{50}Ru_{40}Zr_{10}$ | — | 60 |
| Comparative Example 6 | $Pt_{50}Ru_{40}Cr_{10}$ | — | 60 |
| Comparative Example 7 | $Pt_{50}Ru_{40}Ti_{10}$ | — | 60 |

TABLE 2-continued

| | Catalyst composition | Ratio of peak areas (%) | |
|---|---|---|---|
| | | Major T-element* | Major Q-element** |
| Comparative Example 8 | $Pt_{30}V_{60}Nb_{10}$ | — | — |
| Comparative Example 9 | $Pt_{60}Ru_{10}V_{20}Nb_{10}$ | — | — |
| Comparative Example 10 | $Pt_{95}V_3Nb_2$ | — | — |
| Comparative Example 11 | $Pt_{30.7}Ru_{19}V_{50}Nb_{0.3}$ | — | — |
| Comparative Example 12 | $Pt_{70}V_{15}Nb_{15}$ Solution method | 100 | 100 |

*Ratio of the peak derived from the oxygen bond of the T-element to the peak derived from the metal bond of the T-element.
**Ratio of the peak derived from the metal bond of the Q-element to the peak derived from the oxygen bond of the Q-element.

In all the catalysts of Examples, as shown in Table 2, the area of the peak derived from an oxygen bond of each major T-element is 80% or less of that derived from a metal bond of the element in the XPS spectrum. The area of the peak derived from a metal bond of each major Q-element is 80% or less of that derived from an oxygen bond of the element. In Comparative Example 12 produced by a solution method, on the other hand, almost all the bonds of the T-element and Q-element are in an oxidized state.

The samples measured above are catalysts which have been washed with an acid. There is the case where the peak of an oxide bond of a catalyst is higher before the acid washing than after the acid washing. This is mainly caused by the presence of an unstable oxide layer. In the case of a catalyst which has not been subjected to acid washing, the unstable catalyst layer changed during power generation and usually, the area ratio of the peak derived from an oxide bond is at the same level as in the case of a catalyst which has been subjected to acid washing.

Next, each catalyst obtained in Examples and Comparative Examples was used as an anode catalyst to constitute MEA, which was then used to manufacture a fuel cell, which was then evaluated.

In the production of an anode electrode, first 3 g of each catalyst, 8 g of pure water, 15 g of a 20% Nafion solution and 30 g of 2-ethoxyethanol were stirred sufficiently to disperse and then made into a slurry. The obtained slurry was applied to a carbon paper (350 μm, manufactured by Toray Industries Inc.) which had been subjected to water-repellent treatment by a control coater and dried. Thus, an anode electrode in which the loading density of a noble metal catalyst was 1 mg/cm² was manufactured.

On the other hand, in the production of a cathode electrode, a Pt catalyst was used. 2 g of the Pt catalyst (manufactured by Tanaka Kikinzoku), 5 g of pure water, 5 g of a 20% Nafion solution and 20 g of 2-ethoxyethanol were stirred sufficiently to disperse and then made into a slurry. The obtained slurry was applied to a carbon paper (350 μm, manufactured by Toray Industries, Inc.) which had been subjected to water-repellent treatment by a control coater and dried. Thus, a cathode electrode in which the loading density of a noble metal catalyst was 2 mg/cm² was manufactured.

The cathode electrode and the anode electrode were respectively cut into a 3.2×3.2 cm square such that the area of the electrode was 10 cm². Nafion 17 (manufactured by Du Pont) to be used as a proton conductive solid polymer membrane was sandwiched between the cathode electrode and the anode electrode, followed by pressing under heating to manufacture a membrane electrode assembly. The condition of the pressing under heating was designed to be as follows: 125° C., 10 minutes and 30 kg/cm².

The obtained membrane electrode assembly and a flow path plate were used to manufacture a unit cell of a fuel direct supply type polymer electrolyte fuel cell. An aqueous 1 M methanol solution as fuel was supplied to the anode electrode at a flow rate of 0.6 mL/min and at the same time, air as an oxidant was supplied to the cathode electrode at a flow rate of 200 mL/min. The cell was allowed to discharge under a current density of 150 mA/cm² while the cell was kept at 65° C. to measure the voltage of the cell after 30 minutes. Also, the unit cell was allowed to generate power in the same condition for 500 hours to examine the rate of a reduction in voltage under a current density of 150 mA/cm². The obtained results are shown as the deteriorated rate together with the voltage in Table 3.

TABLE 3

| | Voltage (V) | Rate of deterioration (%) |
|---|---|---|
| Example 1 | 0.48 | 6 |
| Example 2 | 0.50 | 7 |
| Example 3 | 0.48 | 7 |
| Example 4 | 0.47 | 6 |
| Example 5 | 0.47 | 8 |
| Example 6 | 0.49 | 9 |
| Example 7 | 0.48 | 7 |
| Example 8 | 0.49 | 6 |
| Example 9 | 0.50 | 6 |
| Example 10 | 0.51 | 7 |
| Example 11 | 0.53 | 8 |
| Example 12 | 0.49 | 6 |
| Example 13 | 0.50 | 7 |
| Example 14 | 0.51 | 7 |
| Example 15 | 0.48 | 6 |
| Example 16 | 0.48 | 8 |
| Example 17 | 0.49 | 9 |
| Example 18 | 0.50 | 7 |
| Example 19 | 0.48 | 8 |
| Example 20 | 0.50 | 7 |
| Example 21 | 0.49 | 8 |
| Example 22 | 0.48 | 8 |
| Comparative Example 1 | 0.50 | 15 |
| Comparative Example 2 | 0.45 | 18 |
| Comparative Example 3 | 0.47 | 13 |
| Comparative Example 4 | 0.48 | 20 |
| Comparative Example 5 | 0.30 | — |
| Comparative Example 6 | 0.35 | — |
| Comparative Example 7 | 0.30 | — |
| Comparative Example 8 | 0.45 | 25 |
| Comparative Example 9 | 0.45 | 11 |
| Comparative Example 10 | 0.43 | 20 |
| Comparative Example 11 | 0.45 | 40 |
| Comparative Example 12 | 0.35 | 8 |

It is found from a comparison between Comparative Example 1 using only Pt and Ru and Examples 1 to 18 that the catalysts obtained in Examples 1 to 18 are increased in durability and have the same level of activity. It is found from a comparison between Examples 1 to 3 and Comparative Examples 2 and 4 that the addition of a combination of a V element and a Nb element ensures that high stability shown by a rate of deterioration of 10% or less is obtained while maintaining high activity.

When the content of the T-element is less than 20 at. %, or exceeds 50 at. %, high activity shown by a rate of deterioration of 10% or less and high stability cannot be attained at the same time. When the content of the Q-element is less than 0.5 at. %, or exceeds 20 at. %, similarly high stability shown by a rate of deterioration of 10% or less and high activity cannot be attained at the same time. This is also clarified from a comparison between Examples 1 to 18 and Comparative Examples 3 to 11.

It has been confirmed from a comparison between Examples 1 to 3 and Comparative Example 12 that in order to obtain high activity, it is necessary to control not only the composition but also the binding state of the elements.

The above results were confirmed based on an elemental combination of Rt—Ru—V—Nb. However, with regard to elemental combinations of, for example, Pt—Ru—W—Nb and Pt—Ru—W—Cr, the same results have been obtained.

When the methanol oxidation catalyst obtained in Examples was applied to a reformed gas polymer electrolyte fuel cell, the same tendency was confirmed also in this case. Therefore, the methanol oxidation catalyst according to the embodiment is found to be more effective than the current Pt—Ru catalyst as to CO poisoning.

As described above, the catalyst according to the embodiment is highly active and stable, and therefore, this catalyst may be used to produce a high power fuel cell.

The present invention is not limited to the aforementioned embodiments and the structural elements may be modified and embodied within the spirit of the invention in its practical stage. Appropriate combinations of plural structural elements disclosed in the above embodiments enable the production of various inventions. For example, several structural elements may be deleted from all the structural elements shown in the embodiments. Also, the structural elements common to different embodiments may be appropriately combined.

The embodiment of the present invention provides a highly active methanol oxidation catalyst and a method for producing the same.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A methanol oxidation catalyst comprising:
nanoparticles having a composition represented by the following formula 1:

$$Pt_xRu_yT_zQ_u \qquad \text{formula 1}$$

where T is at least one selected from a group consisting of Mo, W and V and Q is at least one selected from a group consisting of Nb, Cr, Zr and Ti, x is 40 to 90 at. %, y is 0 to 9.9 at. %, z is 3 to 70 at. % and u is 0.5 to 40 at. %,
wherein the area of the peak derived from oxygen bond of T is 80% or less of the area of the peak derived from metal bond of T in a spectrum measured by an X-ray photoelectron spectral method.

2. The methanol oxidation catalyst according to claim 1, wherein the z is 30 at. % or less, and the catalyst contains at least one selected from the group consisting of Sn, Hf and Ni in an amount of 0.5 to 30 at. %.

3. The methanol oxidation catalyst according to claim 1, wherein the y is 0 at. %.

4. The methanol oxidation catalyst according to claim 1, wherein the u is 1 to 15 at. %.

5. The methanol oxidation catalyst according to claim 1, wherein a part of the Pt is substituted with noble metal.

6. The methanol oxidation catalyst according to claim 5, wherein the noble metal is at least one selected from a group consisting of Rh, Os, Ir, Pd, Ag and Au.

7. The methanol oxidation catalyst according to claim 1, further comprising 25 at. % or less of oxygen.

8. The methanol oxidation catalyst according to claim 1, wherein a content of at least one impurity element selected from the group consisting of P, S and Cl is 0.1 at. % or less.

9. The methanol oxidation catalyst according to claim 1, wherein the nanoparticles have an average particle diameter of 10 nm or less.

10. The methanol oxidation catalyst according to claim 1, wherein the nanoparticles have an average particle diameter of 0.5 nm or more.

11. The methanol oxidation catalyst according to claim 1, further comprising a conductive support carrying the nanoparticles.

12. The methanol oxidation catalyst according to claim 11, wherein the conductive support is selected from a group consisting of a carbon material and a conductive ceramics material.

13. The methanol oxidation catalyst according to claim 12, wherein the carbon material has a fiber-form, a tube-form or a coil-form.

14. A methanol oxidation catalyst comprising:
nanoparticles having a composition represented by the following formula 1:

$$Pt_xRu_yT_zQ_u \qquad \text{formula 1}$$

where the T is at least one selected from a group consisting of Mo, W, Ni and V and Q is at least one selected from a group consisting of Nb, Cr, Zr, Sn, Hf and Ti, x is 40 to 90 at. %, y is 0 to 9.9 at. %, z is 3 to 70 at. % and u is 0.5 to 40 at. %,
wherein the area of the peak derived from oxygen bond of T element T is 80% or less of the area of the peak derived from metal bond of T in a spectrum measured by an X-ray photoelectron spectral method.

15. A methanol oxidation catalyst comprising:
nanoparticles having a composition represented by the following formula 1:

$$Pt_xRu_yT_zQ_u \qquad \text{formula 1}$$

where T is at least one selected from a group consisting of Mo, W and V and the Q is at least one selected from a group consisting of Nb, Cr, Zr and Ti, x is 40 to 90 at. %, y is 0 to 9.9 at. %, z is 3 to 70 at. % and u is 0.5 to 40 at. %, a part of the Pt is substituted with at least one selected from a group consisting of Rh, Os, Ir, Pd, Ag and Au,
wherein the area of the peak derived from oxygen bond of T is 80% or less of the area of the peak derived from metal bond of T in a spectrum measured by an X-ray photoelectron spectral method.

16. A method for manufacturing the methanol oxidation catalyst according to claim 11, the method comprising:
keeping a conductive support at 400° C. or less; and
depositing structural metal elements to the conductive support by a sputtering method or vapor deposition method to form the nanoparticles.

17. The method according to claim 16, further comprising washing the nanoparticles with an acid.

18. The method according to claim 16, further comprising washing the nanoparticles with an alkali.

19. The method according to claim 16, further comprising subjecting the nanoparticles to after-heat treatment.

20. The method according to claim 19, wherein the after-heat treatment is carried out in the following condition: temperature of 10° C. or more and 400° C. or less and an oxygen partial pressure of less than 5%.

21. The method according to claim 16, wherein the sputtering method or vapor deposition method allows other materials to deposit to the conductive support.

22. The method according to claim 16, wherein a dissolvable metal is deposited together with the structural metal elements to the conductive support by the sputtering method or vapor deposition method, the method further comprising washing with an acid to remove the dissolvable metal.

* * * * *